United States Patent
Baumann et al.

(10) Patent No.: US 8,941,259 B2
(45) Date of Patent: Jan. 27, 2015

(54) ELECTRICAL POWER SUPPLY SYSTEM FOR AN AIRCRAFT

(75) Inventors: Cedric Baumann, Toulouse (FR); Lucien Prisse, Toulouse (FR); Julien Richer, Toulouse (FR); Dominique Alejo, Saint-Gauzens (FR)

(73) Assignee: AIRBUS Operations S.A.S., Toulouse (FR)

( * ) Notice: Subject to any disclaimer, the term of this patent is extended or adjusted under 35 U.S.C. 154(b) by 793 days.

(21) Appl. No.: 13/190,838

(22) Filed: Jul. 26, 2011

(65) Prior Publication Data

US 2012/0025604 A1    Feb. 2, 2012

(30) Foreign Application Priority Data

Jul. 28, 2010   (FR) ...................... 10 56193

(51) Int. Cl.
   *B60L 1/00*   (2006.01)
   *B60L 3/00*   (2006.01)
   *H02G 3/00*   (2006.01)
   *H02J 3/36*   (2006.01)
   *H02J 4/00*   (2006.01)

(52) U.S. Cl.
   CPC ... *H02J 3/36* (2013.01); *H02J 4/00* (2013.01); *Y02T 50/545* (2013.01); *Y02E 60/60* (2013.01); *Y02T 50/54* (2013.01)
   USPC .......................... 307/9.1; 307/10.1

(58) Field of Classification Search
   CPC ....................................................... B60L 1/00
   USPC .................................. 307/9.1, 10.1
   See application file for complete search history.

(56) References Cited

U.S. PATENT DOCUMENTS

| | | | | |
|---|---|---|---|---|
| 5,760,488 | A * | 6/1998 | Sonntag | 307/10.1 |
| 7,800,880 | B2 * | 9/2010 | Hu et al. | 361/111 |
| 8,136,756 | B2 * | 3/2012 | Duces et al. | 244/58 |
| 8,299,732 | B2 * | 10/2012 | Hoadley et al. | 318/105 |
| 2008/0100136 | A1 | 5/2008 | Langlois et al. | |
| 2008/0174177 | A1 | 7/2008 | Langlois et al. | |

FOREIGN PATENT DOCUMENTS

| | | |
|---|---|---|
| FR | 2 573 256 | 5/1986 |
| FR | 2 872 581 | 1/2006 |
| FR | 2 907 760 | 5/2008 |
| FR | 2 911 442 | 7/2008 |

OTHER PUBLICATIONS

French Preliminary Search Report issued Jun. 17, 2011, in Patent Application No. 1056193 (with English Translation of Category of Cited Documents).
U.S. Appl. No. 13/379,821, filed Dec. 21, 2011, Prisse, et al.

* cited by examiner

*Primary Examiner* — Jared Fureman
*Assistant Examiner* — Toan Vu
(74) *Attorney, Agent, or Firm* — Oblon, Spivak, McClelland, Maier & Neustadt, L.L.P.

(57) ABSTRACT

The invention relates to an electrical power supply system for an aircraft comprising at least one main generator (20) feeding at least one technical load and at least one commercial load through at least one electrical power distribution channel comprising at least one electrical distribution busbar (21, 23, 25) and at least one voltage converter (22, 24, 26), wherein the grounding mode of at least one load is an IT type grounding scheme, with an isolated or high impedance neutral.

6 Claims, 6 Drawing Sheets

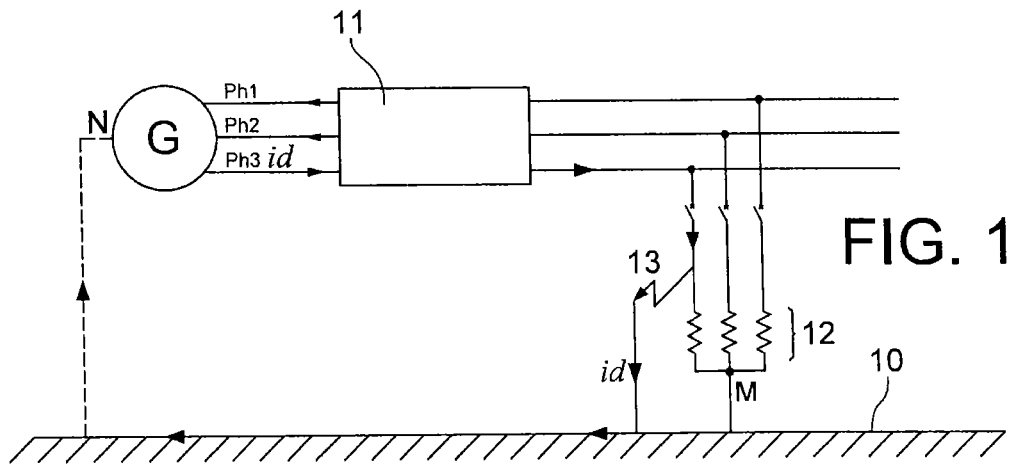
RELATED ART
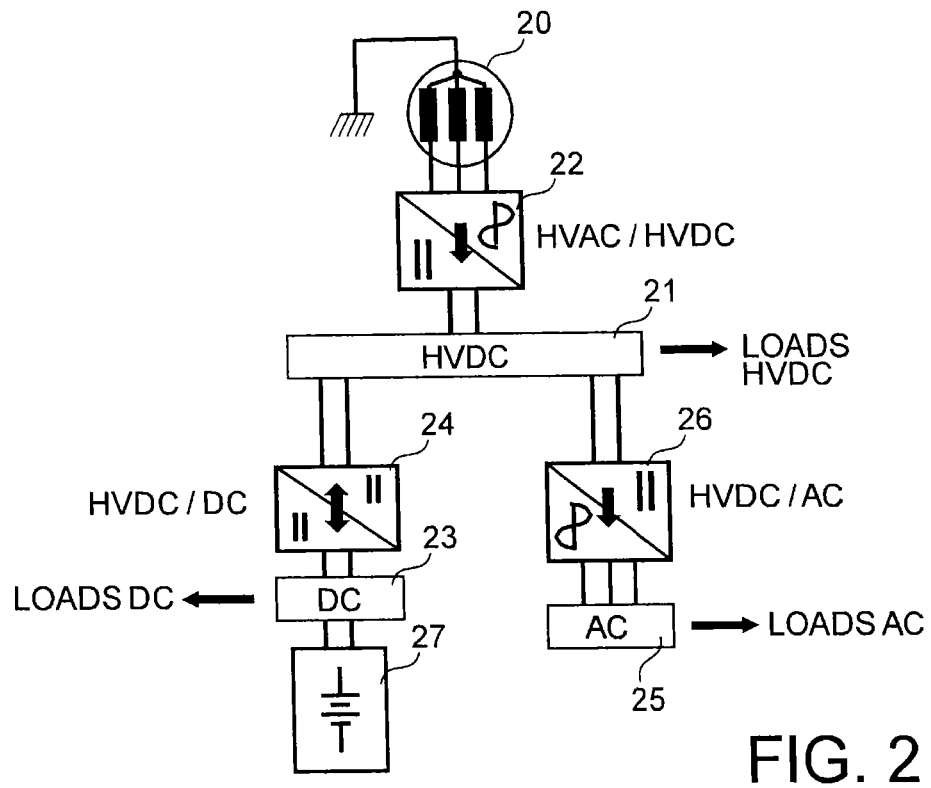
RELATED ART

ELECTRICAL POWER SUPPLY SYSTEM FOR AN AIRCRAFT

TECHNICAL FIELD

The invention relates to an electrical power supply system for an aircraft, for an airplane for example.

In what follows, for the sake of simplicity, an airplane type aircraft is considered by way of example.

PRIOR STATE OF THE ART

In an airplane, the technical and commercial electrical loads are fed by main and auxiliary generators through distribution channels comprising electrical distribution busbars and voltage converters.

In order to ensure the protection of goods and of persons the ground connection mode in an aeronautical electrical power grid uses a TN-C type scheme. This mode makes it possible to easily ensure selectivity of the protections despite the large number of loads connected. These loads can in particular be commercial loads, the number whereof depends on the cabin accommodation selected by the client company.

This TN-C type scheme means:
T: neutral conductors of the installation connected directly to ground,
N: installation frames connected to the neutral conductor,
C: installation frame protection conductor and neutral conductor being coincident.

As illustrated in FIG. 1, in an electrical power supply system on board an airplane, the neutral of each main generator G is connected to the fuselage 10 of the airplane in order to ensure a return path for unbalanced phase and fault currents. In addition, all the frames of the different loads are connected to this fuselage. The fuselage therefore plays the roles of neutral conductor and ground at the same time. Thus, in FIG. 1 are shown a three-phase generator G, the neutral whereof is connected to the fuselage 10, connected to an electrical power center 11 by its phases ph1, ph2 and ph3, a phase-to-ground fault load 12, the frame of which is connected to the fuselage 10. A fault current id 13 relating to this fault load 12, which passes to the fuselage 10, is also illustrated.

However, in such a TN-C type ground connection scheme, the protections are triggered when the first electrical fault appears, which is very prejudicial for the design of the technical loads.

In the case of a "more electric airplane," connection of and power supply to the loads is accomplished using distribution channels such as that illustrated in FIG. 2. In this figure, a VFG HVAC generator 20 is connected to an HVDC distribution busbar 21 through an HVAC/HVDC converter 22. This HVDC busbar 21 is connected firstly to a DC distribution busbar 23 through an HVDC/DC converter 24 and additionally to an AC distribution busbar 25 through an HVDC/AC converter 26. The DC distribution busbar 23 is connected to a battery+charger set 27.

The requirements with regard to power necessitate the use of a high distribution voltage, which allows the mass of the airplane systems and of the cabling to be reduced. However, the commercial loads and the calculators must still be supplied with 115 volts AC and 28 volts DC for reasons of compatibility with existing equipment. The power supply to these loads is thus accomplished through converters.

The invention has as its object to resolve these problems by using converters for accomplishing the separation of the electrical grid into a "technical" part and a "commercial" part, the two parts using different ground connection modes.

DESCRIPTION OF THE INVENTION

The invention relates to an electrical power supply system for an aircraft, comprising at least one main generator feeding at least one technical load and at least one commercial load through at least one electrical distribution channel comprising at least one electrical distribution busbar and at least one voltage converter, characterized in that the ground connection mode of at least one load is an IT ground connection scheme, with an isolated or high impedance neutral, and in that the high power technical loads use an IT type ground connection scheme and the commercial loads use a TN-C type ground connection scheme, such a separation being achieved for the purpose of protecting the loads.

Advantageously, at least one load has a TN-C type ground connection scheme.

Advantageously, a separation between these two ground connection schemes is accomplished through galvanic isolation means, for example voltage converters.

Advantageously a permanent insulation monitor allows protection of the loads supplied by the system using the IT type connection scheme.

Advantageously the system of the invention comprises at least one AC generator without a neutral connection, such a connection having become unnecessary for the purposes of protection.

The invention also relates to an aircraft including such a system.

The system of the invention greatly facilitates protection against short-circuits within the scope of a composite-built airplane.

BRIEF DESCRIPTION OF DRAWINGS

FIGS. 1 and 2 illustrate two prior art arrangements.

DETAILED DESCRIPTION OF PARTICULAR EMBODIMENTS

In the system of the invention two different modes of ground connection are used, selected in the following fashion:

The high power technical loads use an IT type ground connection scheme, that is with a neutral isolated from ground or having high impedance, and the frames of these loads connected to the structure of the airplane or to a conductive structure allowing current return in the case of an airplane using thermoplastic composite materials. Such an IT scheme is used in industrial installations requiring continuity of service. It is, however, not used up until now in the aeronautical field.

The commercial loads use a TN-C type grounding scheme.

The separation between these two grounding schemes is accomplished through elements providing galvanic isolation. Indeed:

The high power technical loads, which operate with a high voltage of 230 Volts AC or +/−270 Volts DC, need a high level of availability and are not numerous;

The commercial loads and certain lower power technical loads, which operate at voltages of 115 volts AC and 28 volts DC, are numerous.

Figure 3:
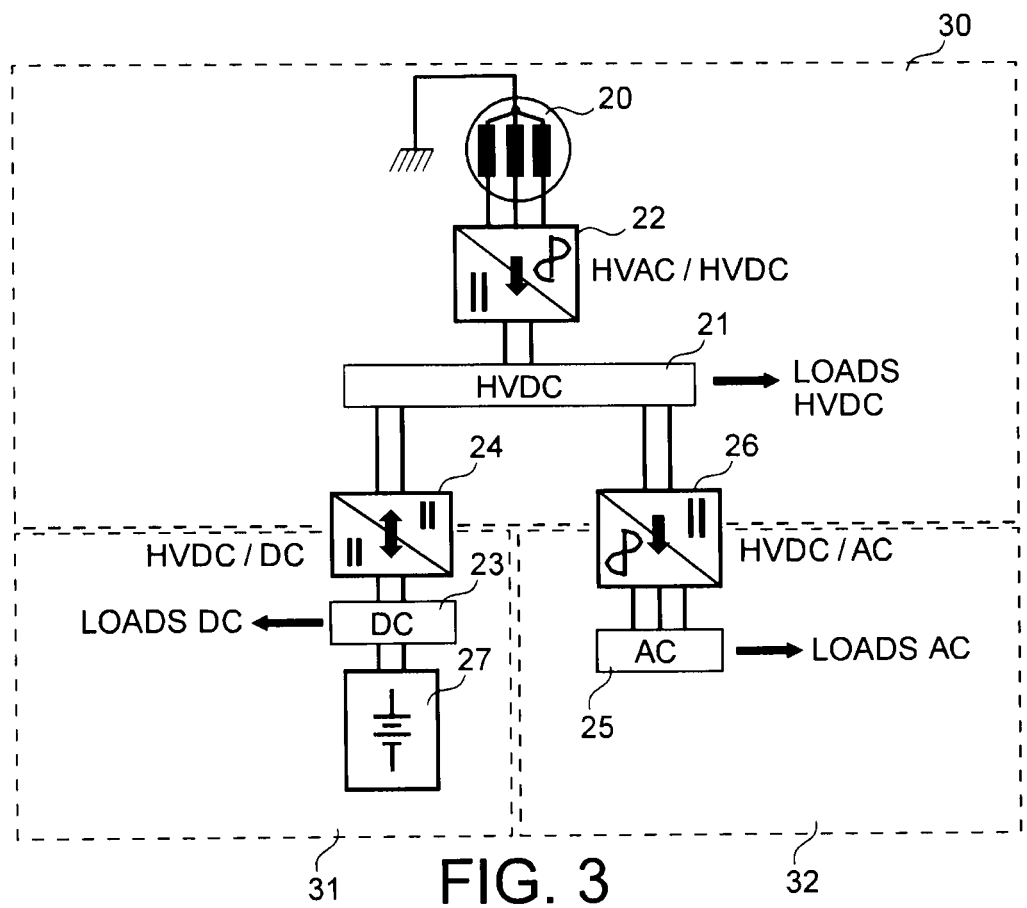
FIG. 3 illustrates the system of the invention.
Figure 4:
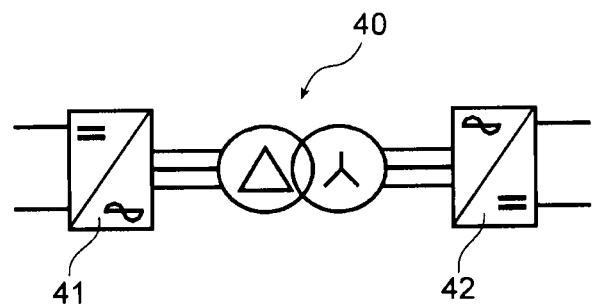
FIGS. 4 through 11 illustrate different features of the system of the invention.

In order to achieve the separation of a channel into a "sub-network," as illustrated in FIG. 3, and to use the different grounding schemes, a galvanic isolation is used between the "sub-networks," achieved for example by the use of converters. In FIG. 3 there are thus three sub-networks 30, 31 and 32 and three converters, HVAC/HVDC 22, HVDC/DC 24 and HVDC/AC 26 respectively. Indeed:

The HVDC (High Voltage Direct Current)←→DC voltage conversion can be accomplished for example through a reversible BBCU (Buck Boost Converter Unit) converter 40 having isolation stages 41 and 42, as represented in FIG. 4.

Figure 5:
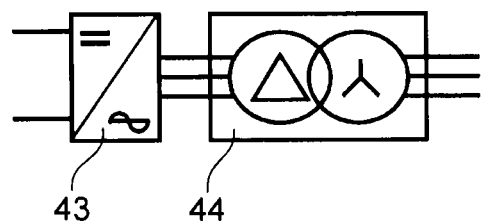

The HVDC ←→ AC voltage conversion can be accomplished for example through a converter 26 comprising an inverter module 43 associated with a filter 44 which can include isolation, as illustrated in FIG. 5.

Figure 6:
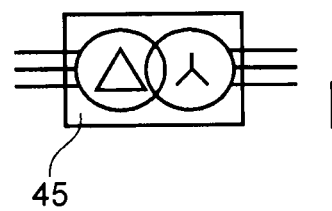

An HVAC (High Voltage Alternating Current) ←→ conversion can for example use an ATU (autotransformer unit) transformer 45, which allows isolation to be achieved, as illustrated in FIG. 6.

Figure 7:
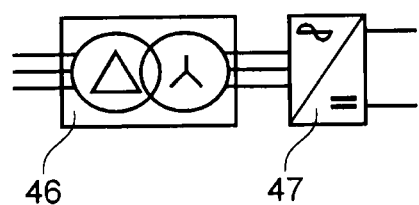

An HVAC ←→ DC conversion can for example use a TRU (Transformer Rectifier Unit) transformer-rectifier 46 and an isolation stage 47, as illustrated in FIG. 7.

FIGS. 4 through 7 show converters using a delta-wye connection. But it is possible to contemplate any other combination of connections between primary and secondary, as long as they allow isolation between the primary and the secondary.

Protection Using an "IT" Type Grounding Scheme

A high voltage "sub-network" can be protected by using an "IT" scheme, which uses a permanent insulation monitor (PIM) to protect the network. This monitor can be connected on the alternating side or on the direct current side. In both cases, fault detection works.

Figure 8:
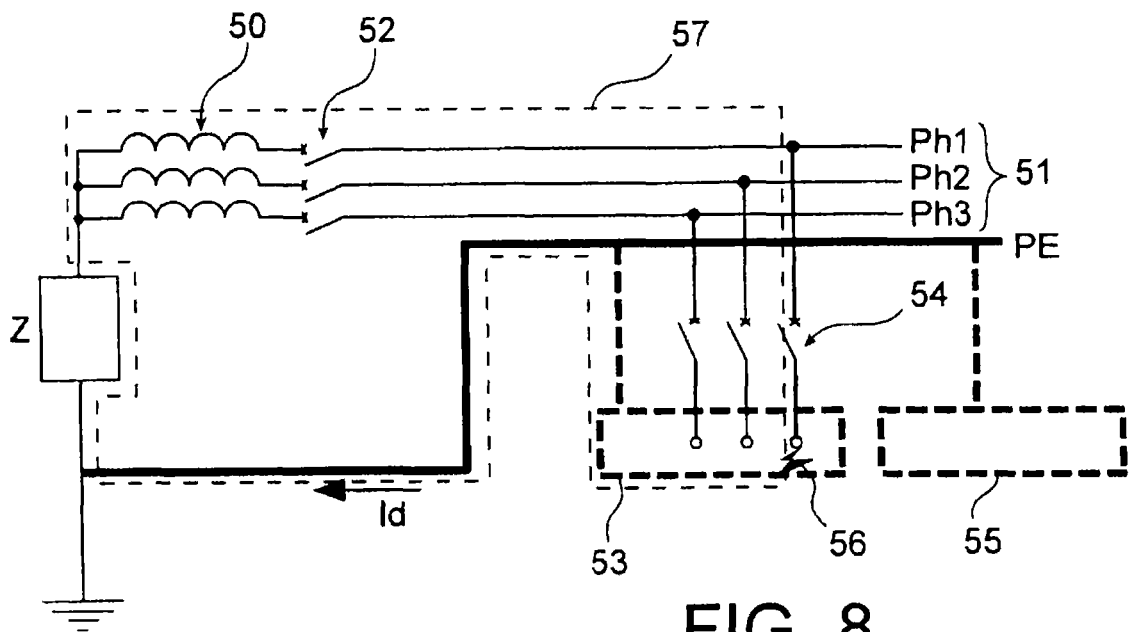
Figure 9:
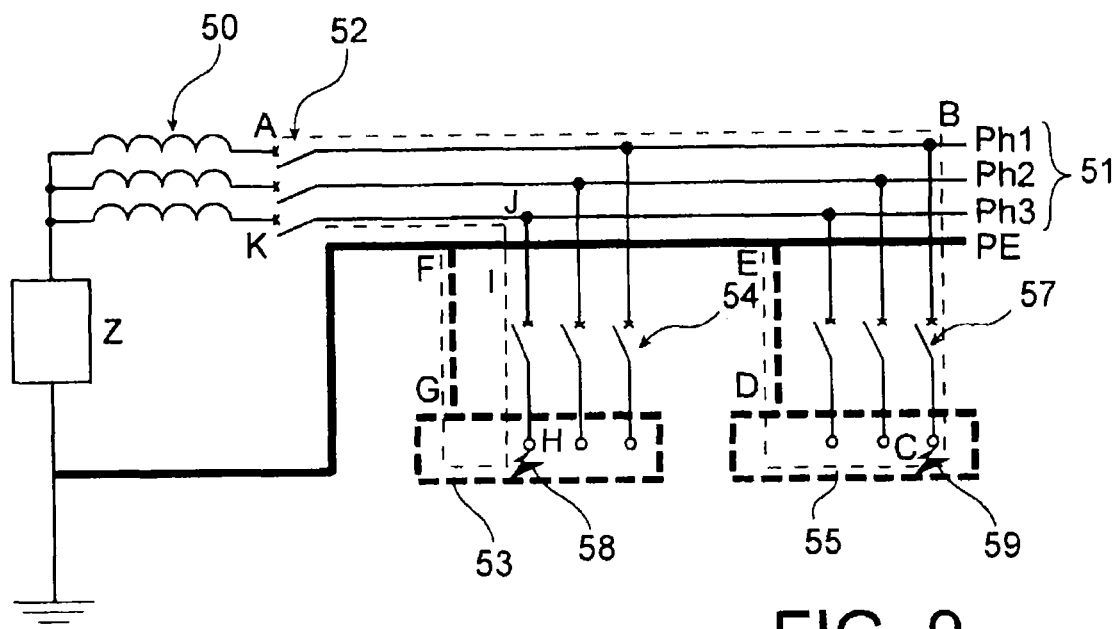

FIGS. 8 and 9 illustrate a protection using an "IT" type grounding scheme in the case of a single fault or a double fault:

In the case of a single fault, the fault current is limited by a high neutral-to-ground impedance. There is therefore no danger and the fault is detected.

In the case of a double fault, we are dealing with a fault similar to a single fault in "TN-C" mode. The same protective devices can then be used.

FIG. 8 illustrates a generator 50 comprising three stator inductors, the neutral (common) point whereof is connected to ground through a high impedance Z, sized so as to have a non-hazardous fault current. This generator 50 can be connected to the electrical network 51 through a three-phase switch 52. A first load 53 can be connected to the electrical network through a three-phase switch 54. A second load 55 is also shown. The line PE represents the equipotential line of the connection of the frames of the loads 53 and 55 to ground. When an insulation fault 56 arises, here on phase ph1 of the first load 53, a fault current id circulates following the loop 57 and therefore passes through the impedance Z, which limits the value of this current id.

In FIG. 9, the same elements are found as those shown in FIG. 8. The second load 55 is now connected to the network through a three-phase switch 57. When a double insulation fault arises, here a fault 58 on phase ph3 of the first load 53 and a fault 59 on phase ph1 of the second load 55, the fault current follows the loop A, B, C, D, E, F, G, H, I, J, K, A, and does not pass through the impedance Z.

The technical loads can be preserved in the event of a single fault. Manual or automatic fault tracing then makes it possible to determine the fault.

Figure 10:
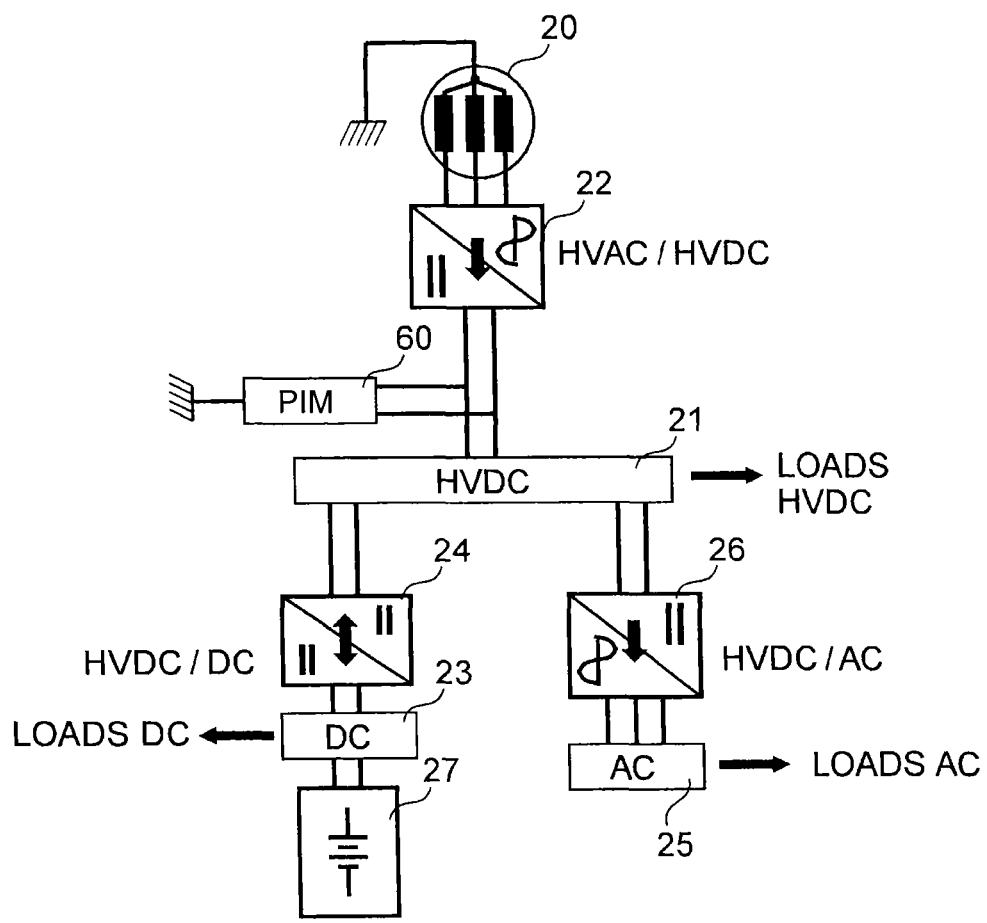

On a power channel, a permanent insulation monitor PIM 60 is added as illustrated in FIG. 10.

Protection Using a "TN-C" Type Grounding Scheme

This protection scheme is widespread in the aeronautical field. The electrical network is subdivided into multiple sub-networks, each of which has an isolation transformer, the secondary whereof has a distributed neutral. The neutral of the transformer can be connected to ground and the frame of each of the loads also connected to ground. We then have a "TN" type scheme.

Such a design makes it possible to retain the simplicity of implementation of this grounding mode and its natural ease of operation with multiple loads.

Abnormal Operation

Figure 11:
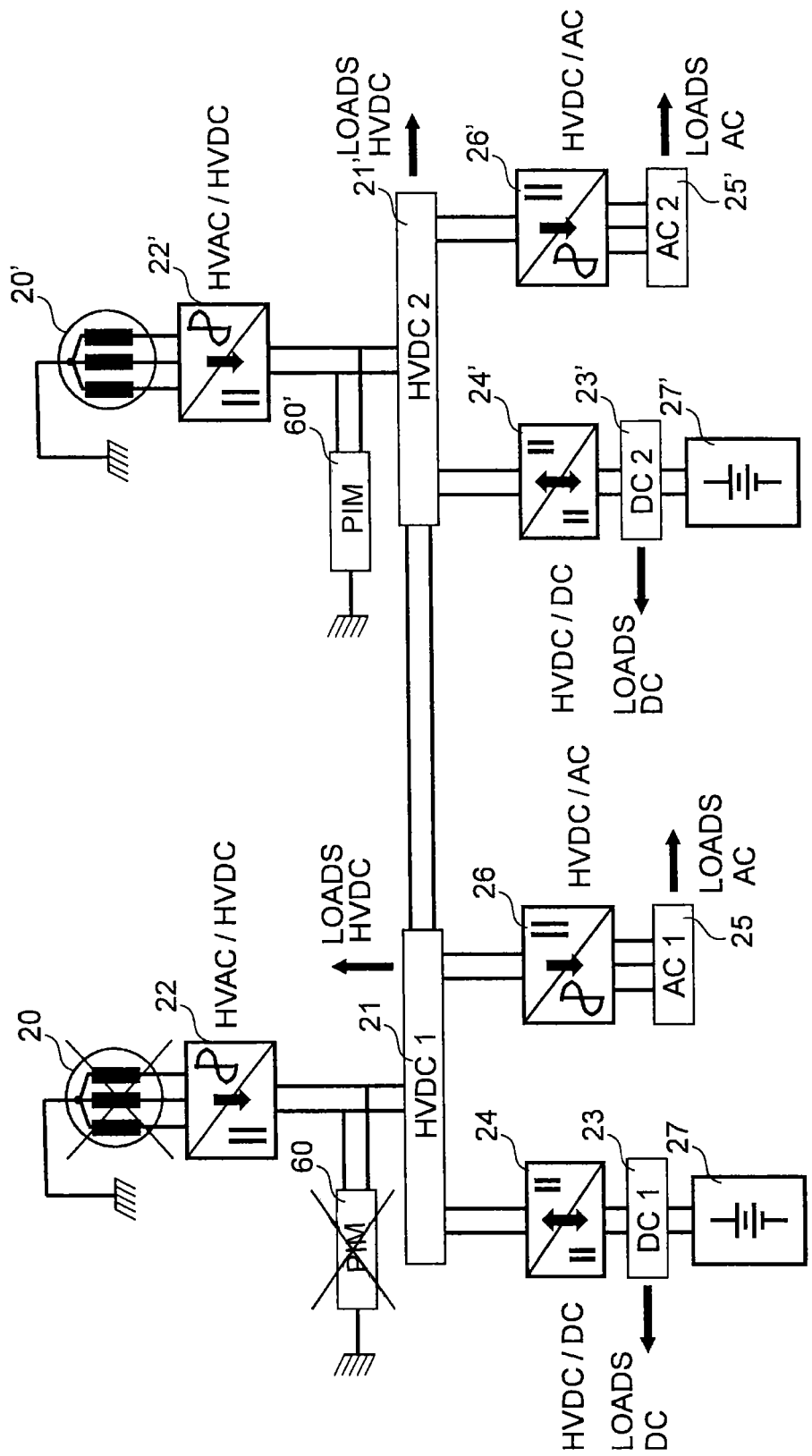

By "abnormal operation" is meant the loss of a generator and the consequent takeover of a channel by another generator, as illustrated in FIG. 11. In this figure, the channel already illustrated in FIG. 10 is shown, and a second channel the reference numbers whereof correspond to those of FIG. 10 with the addition of a "'".

In this case, the permanent insulation monitor 60 of one of the two channels is inhibited, the other permanent insulation monitor 60' allowing the protection of the full network to be accomplished.

Impact on Distribution

According to the subdivision of the electrical network that is performed, the part of the network that is protected by an "IT" type grounding scheme includes the generators. Thus, it is not necessary to distribute the neutral of the generators, which then makes it possible to simplify the installation and to reduce the mass of the associated feeder line.

Further, the fact of not having a distributed neutral eliminates by construction the voltage harmonics that are multiples of three. New stator winding designs, allowing harmonics to be limited, can therefore be used. Indeed, during the design of a generator, the stator windings are arranged so as to minimize harmonics which generate losses. As it is not possible to reduce all harmonics, the choice often falls on suppression of the harmonic of order 3, which requires a particular kind of winding. In the invention, the elimination of the neutral makes it possible to also eliminate any harmonic of an order that is a multiple of 3. It is therefore possible to suppress or reduce any harmonic of higher order, 5 or 7 for example, which allows the generator to have fewer losses and therefore to be optimized as regards efficiency.

In the case of an airplane made of thermoplastic composite material (CFRP), as the neutral cabling can extend all the way to the electrical power center, the contactor and the terminals associated with this cabling can be eliminated.

The invention works no matter what kind of generator is used: for example IDG (integrated drive generator), VFG (Variable Frequency Generator) or even PMG (Permanent Magnet Generator), with or without a starting function.

The invention claimed is:

1. An electrical power supply system for an aircraft comprising:

an electrical network including at least one main generator feeding at least one technical load and at least one commercial load through at least one electrical power distribution channel including at least one electrical distribution busbar and at least one voltage converter, wherein the electrical network is divided into multiple sub-networks, a galvanic isolation using voltage converters being established between the sub-networks, wherein first sub-networks of the multiple sub-networks correspond to a high power technical load and are protected using an IT type grounding with neutral isolated from ground or having a high impedance, and second sub-networks of the multiple sub-networks correspond to the commercial loads and a low power technical load, the second sub-networks being protected by a TN-C type grounding.

2. The electrical power supply system according to claim 1, wherein the separation between the IT and TN-C type groundings is accomplished through the voltage converters, the voltage converters being one of a HVAC/HVDC voltage converter, a HVDC/DC voltage converter, and a HVDC/AC voltage converter.

3. The electrical power supply system according to claim 1, wherein the separation between the IT and TN-C type groundings is accomplished through galvanic isolation means.

4. The electrical power supply system according to claim 1, further comprising a permanent insulation monitor to protect the loads fed by the first sub-networks.

5. The electrical power supply system according to claim 1, further comprising at least one AC generator without a neutral connection.

6. An aircraft comprising:
an electrical power supply system including
an electrical network including at least one main generator feeding at least one technical load and at least one commercial load through at least one electrical power distribution channel including at least one electrical distribution busbar and at least one voltage converter, wherein the electrical network is divided into multiple sub-networks, a galvanic isolation using voltage converters being established between the sub-networks,
wherein first sub-networks of the multiple sub-networks correspond to a high power technical load and are protected using an IT type grounding with neutral isolated from ground or having a high impedance, and second sub-networks of the multiple sub-networks correspond to the commercial loads and a low power technical load, the second sub-networks being protected by a TN-C type grounding.

* * * * *